(12) United States Patent
Stead

(10) Patent No.: US 6,651,089 B1
(45) Date of Patent: Nov. 18, 2003

(54) SURFING FRIENDLY MULTICASTING ARRANGEMENT

(75) Inventor: Larry Stead, Upper Montclair, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/327,344

(22) Filed: Jun. 5, 1999

(51) Int. Cl.[7] ............................................. G06F 15/16
(52) U.S. Cl. ................. 709/217; 709/203; 709/201; 709/218; 709/219; 370/351; 725/86; 725/87; 725/95; 725/96
(58) Field of Search ........................... 709/201–203, 709/225–227, 238, 217–219; 370/351–352, 355–356, 341; 725/138, 38, 101.41, 1.53, 86–87, 95–96, 120; 455/450; 345/721

(56) References Cited

U.S. PATENT DOCUMENTS 6,101,180 A * 8/2000 Donahue et al. ............ 370/352
6,357,045 B1 * 3/2002 Devaney ..................... 725/138
6,492,997 B1 * 12/2002 Gerba et al. ................ 345/721

* cited by examiner

Primary Examiner—Robert B. Harrell
Assistant Examiner—Hien C. Le
(74) Attorney, Agent, or Firm—Henry Brendzel

(57) ABSTRACT

An arrangement that is particularly suitable for Internet, where a user receives a number of channels concurrently. The channel that is of current interest to the user is sent with a given bandwidth, while other channels (surfing channels) are sent at reduced bandwidth. The user's receiver buffers all of the received channels, and plays the channel of current interest in full fidelity. When a user wishes to surf, the buffered surfing channels are made available and are played to the user in accordance with the user's requests. When the user selects another channel to be of current interest, the user's terminal sends out a request for the new channel to be sent to the user at the given bandwidth, and thence provides the user with the newly selected channel at full fidelity.

37 Claims, 5 Drawing Sheets

LEGEND
C=COMBINER SERVER
R=ROUTER
T=TERMINAL
S=SOURCE
S1,S2,S3,S4,S5=SIGNAL STREAMS

LEGEND
C=COMBINER SERVER
R=ROUTER
T=TERMINAL
S=SOURCE
S1,S2,S3,S4,S5=SIGNAL STREAMS

LEGEND
C=COMBINER SERVER
R=ROUTER
T=TERMINAL
S=SOURCE
S1,S2,S3,S4,S5=SIGNAL STREAMS

LEGEND
C=COMBINER SERVER
R=ROUTER
T=TERMINAL
S=SOURCE
S1,S2,S3,S4,S5=SIGNAL STREAMS

LEGEND
C=COMBINER SERVER
R=ROUTER
T=TERMINAL
S=SOURCE
S1,S2,S3,S4,S5=SIGNAL STREAMS

SURFING FRIENDLY MULTICASTING ARRANGEMENT

BACKGROUND OF THE INVENTION

This invention relates to a method for providing audio, video and/or data communication services, in real-time, to a multiplicity of users on a communications network, such as the Internet.

Systems such as the Internet typically are point-to-point, or unicast, systems in which a message is converted into a series of addressed packets that are routed from a source node through a plurality of routers to a destination node. In most communication protocols the packet includes a header which contains the addresses of the source and the destination nodes as well as a sequence number which specifies the packet's order in the message. Although the Internet was initially used in this manner almost exclusively, it is now also used for multicasting, where many points transmit, and each transmitting point transmits to many points. Conferencing is one example where multicasting is found to be useful. To satisfy such demands, packets destined for several recipients are sometimes encapsulated in a unicast packet and forwarded from a source to a point in a network where the packets are replicated and forwarded on to all desired recipients. This technique is known as IP Multicasting and the network over which such packets are routed is referred to as the Multicast Backbone, or MBONE. More recently, routers have become available which can route the multicast addresses (class D addresses) provided for in communication protocols such as TCP/IP and UDP/IP. A multicast address is essentially an address for a group of host computers who have indicated their desire to participate in that group. Thus, a multicast packet can be routed from a source node through a plurality of multicast routers (or mrouters) to one or more devices receiving the multicast packets. From there the packet is distributed to all the host computers that are members of the multicast group.

These techniques have been used to provide on the Internet audio and video conferencing as well as radio-like broadcasting to groups of interested parties. See, for example, K. Savetz et al. MBONE Multicasting Tomorrow's Internet (IDG Books WorldWide Inc., 1996). Other details concerning technical aspects of multicasting may be found in the Internet documents Request for Comments (RFC) 1112 and, and in D. P. Brutaman et al., "MBONE provides Audio and Video Across the Internet," IEEE Computer, Vol. 27, No. 4, pp. 30–36 (April 1994).

Indeed, there is now a great deal of music and other audio and video content that is being transmitted over the Internet as multicast transmissions. This situation will, no doubt, lead to the kind of channel surfing that viewers engage in with their home TVs. However, unlike the situation with home TVs, car radios, and the like, switching between multicasting channels on the internet is not straight forward, in that when switching to a new channel, buffering and routing operations must be done which cause a several second delay in receiving the content of the newly selected channel. This makes the surfing unsatisfactory because it is much slower than what people are used to.

SUMMARY OF THE INVENTION

The above-mentioned deficiency is overcome, in accordance with the principles disclosed herein, with an arrangement where a user receives a number of channels concurrently. The channel that is of current interest to the user is sent with a given bandwidth, while other channels (surfing channels) are sent at reduced bandwidth. The user's receiver buffers all of the received channels, and plays the channel of current interest in full fidelity. When a user wishes to surf, the buffered surfing channels are made available and are played to the user in accordance with the user's requests. When the user selects another channel to be of current interest, the user's terminal sends out a request for the new channel to be sent to the user at the given bandwidth, and thence provides the user with the newly selected channel at full fidelity.

DETAILED DESCRIPTION

Figure 1:
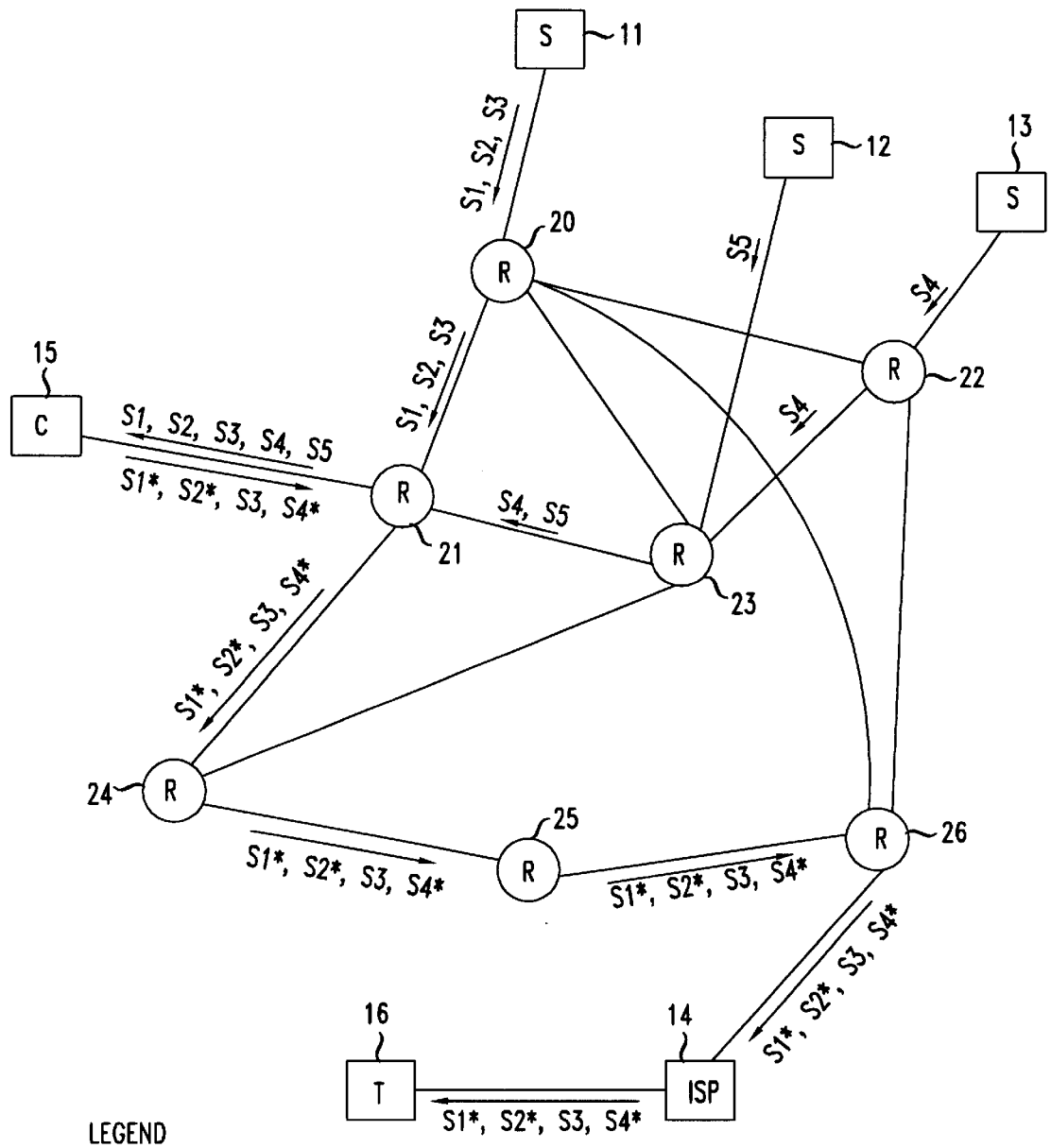
FIG. 1 illustrates what might be a portion of a packet network with a plurality of multicast streams from a number of sources, where streams are combined in a combiner server to create a signal that is fashioned for a user in accordance with user requests.

FIG. 1 illustrates a small packet network with multicast information source sites 11, 12, and 13 coupled to routers 20, 23 and 22 of the network, respectively, a combiner server 15 coupled to router 21 of the network, an Internet Service Provider (ISP) processor 14 coupled to router 26 of the network, and a user's terminal 16 coupled to ISP processor 14. Element 16 may be a personal computer that is coupled to ISP processor 14, for example, though a direct connection, a cable modem, a wireless coupler, or a dial-up modem. Source 11 outputs multicast streams s1, s2, and s3, source 12 outputs multicast stream s5, and source 13 outputs multicast stream s4. Each of the signals s1–s5 is a full bandwidth signal, which means that the signal offered by a source occupies some given bandwidth that the provider of the signal chose for its standard, good quality, signal—perhaps in accordance with an agreed-upon standard. In the case of music, for example, it may be a song that is coded so that no buffering is needed other than the buffering needed to take account of variations in network transmissions. In this disclosure, such a signal is also referred to as full fidelity signal. By contrast, a reduced bandwidth signal either provides a poorer quality facsimile of the full fidelity signal, or requires buffering of the received signal in order to construct only a portion of the full fidelity signal. In a sense, all variations on the signal transmitted with reduced signal omit some information, relative to the full fidelity signal. Therefore, in this disclosure, a signal that occupied a reduced bandwidth is also referred to as the reduced fidelity signal. A reduced fidelity signal can be created by a source, or can be generated elsewhere from a full fidelity signal.

The links that connect the various routers of FIG. 1 are wide bandwidth links. The narrow transmission path, or channel, is the connection between user terminal 16 and IPS processor 14. In the case of dial-up modems, the currently conventional upper bound for this connection is 56 Kbytes/sec. It may be noted, however, that with current standard encoding technologies, the bandwidth required for a full fidelity signal is lower than the capacity of the channel between ISP processor 14 and terminal 16. Conversely, capacity of the channel between ISP processor 14 and terminal 16 permits more than one full fidelity signal to be sent to terminal 16 and, in fact, permits the sending of one full fidelity signal and a number of reduced fidelity signals.

The arrangement of FIG. 1 is adapted to provide users of terminal 16 with the ability to receive a selected one of the signals offered by the various sources at full bandwidth, and one or more selected signals of the signals offered by the various sources at a reduced bandwidth. For expository purposes, it is assumed in the FIG. 1 illustration that a user wishes to have access to streams s1 through s4. For the embodiment of FIG. 1, in accordance with the principles of this disclosure the user (through terminal 16) informs combiner server 15 of this wish. Combiner server 15 is, effectively, a service provider for terminal 16 and, perhaps, other terminals. Such other terminals (not shown) may ask for the same streams, or perhaps other streams. In the FIG. 1 illustration, it is assumed that some user terminal wishes to have access to each and every one of the multicast streams. Consequently, combiner server 15 establishes appropriate connections in the Internet, through packet replicating multicast routers, and receives the five signals s1, s2, s3, s4, and s5. In the FIG. 1 illustration, it is assumed that user terminal 16 requests only streams s1 through s4 and, accordingly, combiner server 15 processes those signals and sends them to user terminal 16, via the network links that connect router nodes 21, 24, 25, and 26.

In accordance with the principles of this disclosure, the user informs combiner server 15 that a given signal, e.g., s3 is the channel of current interest. Since the communication path between IPS processor 14 and terminal 16 is some given maximum capacity, combiner server 15 constructs a signal that comprises the channel of current interest (s3) in full fidelity and reduced fidelity signals s1*, s2*; and s4*. The bandwidth of the reduced signal is either set to some prearranged value, or is set to occupy whatever bandwidth is available. For example, when the bandwidth between ISP processor 14 and terminal 16 is 56 Kbits/sec, and a full fidelity signal occupies 20 Kbits/sec, then the reduced bandwidth signals can be set to some fixed bandwidth, e.g. 5 Kbits/sec, or the 36 Kbits/sec remaining bandwidth can be divided among the s1*, s2*, and s4* signals, yielding a bandwidth of 12 Kbits/sec for each reduced fidelity signal.

In the FIG. 1 embodiment, the processing required to achieve such transmissions is carried out in combiner server 15. Because the arrival of packets at terminal 16 is not uniform, all of the incoming packets are buffered within terminal 16.

Thus, as illustrated in the FIG. 1 embodiment, the channel of current interest that the user of terminal 16 receives in full fidelity is s3, and the surfing channels are signals s1*, s2*, and s4* (the "*" next to signals s1, s2, and s4 indicates that those signals are at reduced fidelity). The s1*, s2*, s3, and s4* stream of packets traverses the links that connect routers 21, 24, 25, and 26, and thence arrives at ISP processor 14. ISP processor 14 forwards this stream to user terminal 16.

Having received signals s1*, s2*, s3, and s4*, the user of terminal 16 can play signal s3 in full fidelity. The user can, however, switch to any of the other signals, and while that signal is available immediately, offering the desired surfing capability, it must be admitted that the terminal 16 user has access only to the lower fidelity replica of the signal sent by the source, e.g., s1*. The user has the option, of course, to accept (listen/view) the lower fidelity signal, or change the designation of the channel of current interest (from s3 to either s1, s2, or s4). When the user of terminal 16 changes the channel of current interest designation, user terminal 16 informs ISP processor 16 of the modified channel of current interest, and that information is communicated to combiner server 15. In response to a designation of, say, s1 as the channel of current interest, combiner server creates the new signal stream s1, s2*, s3*, and s4*, and forwards that to user terminal 16 via ISP processor 14.

It should be appreciated that the low bandwidth signals need not be all sent with the same low bandwidth. Different signals can be granted different bandwidths, depending on a variety of criteria. Illustratively, signals of some sources can be preassigned by the user to get higher bandwidth than signals of other sources (e.g. because the signals of those sources are favorites of the user), or signals of sources that were recently played in full fidelity are given a higher bandwidth (on the assumption that the user is likely to return to those signals), etc.

It should also be appreciated that the number of the low fidelity channels need not be fixed, although some practical upper bound will always exist, since a signal with an extremely low bandwidth might be too unintelligible to be of much use even for surfing. Moreover, the identity and the number of low fidelity channels can be dynamically varying. For instance, a user may inform combiner server 16 to cycle through 50 signals (s1 through s50), n narrow band signals at a time, where n varies between 4 and 8. The algorithm for such cycling might be that the number n is a function of the time the user spends at each surfed signal, settling to n=4 when the user is not surfing, or surfing at less than a certain rate. To cycle through the 50 signals, combiner server 15 might be instructed to send, at some given time, narrow band signal s4*, s29*, s12*, and s13*, where the first two narrow band signals are signal that were viewed previously (as surfed signals, or as the channel of current interest) and the last two are the next signals in a preordained sequence of the s1 through s50 signals to be cycled through. When the user switches to signal s13*, for instance, combiner server 16 may be instructed to automatically drop one of the previously surfed channels, and add a new channel from the set of 50 signals, resulting, for example, in a stream that includes the signals s29*, s12*, s13*, and s14*.

The above is, of course, merely illustrative. There are many other algorithms that a designer may chose to apply. For instance, the algorithm might follow some selected predictive model that is based on which channel the user has surfed, and where the user is most likely to surf to next (e.g. listening to jazz stations suggests that the user is a jazz aficionado), what screen button the user's mouse is closest to, etc.

In the above description, the narrow band signals that is sent by combiner server 15 is a low fidelity replica of the normal fidelity signal sent by the source, which is created within combiner server 15. This may be the preferred surfing signal for various applications, such as the presidential State of the Union address, but it might not be the preferred surfing signal for all applications. Borrowing the notion of upcoming attraction advertisements from other entertainment media, it is quite conceivable that, at least for some applications, the preferred surfing signal is a normal fidelity short time segment of the signal that is being sent. This might be the first 5 seconds of the song (for example) that is currently being sent out by the source, or queued to be sent out by the source, etc. That is, while a source is sending out a packet stream that corresponds to a song in full fidelity, and users that wish to receive the full fidelity signal receive that stream, users that wish to only receive the preview signals are caused to receive the full fidelity of only a portion of the currently playing song, stretched out in time. Sending 5 second's worth of a 3 minute song with a 5 to 1 bandwidth reduction takes 25 seconds before the full preview is accumulated. Users switching to convert a previewed station as the channel of current interest will experience a temporal discontinuity, but in many applications users will not mind. Of course, when the preview is that of a queued-up song, there will not be any temporal discontinuity.

The task of creating the preview segments may be given over to combiner server 15, but there are certainly embodiments (e.g. sending a preview of what is being queued for future transmission) where the sources themselves need to create the preview segments and send them to combiner server 15. This is illustrated in FIG. 2, with signals p1 through p5.

Figure 3:
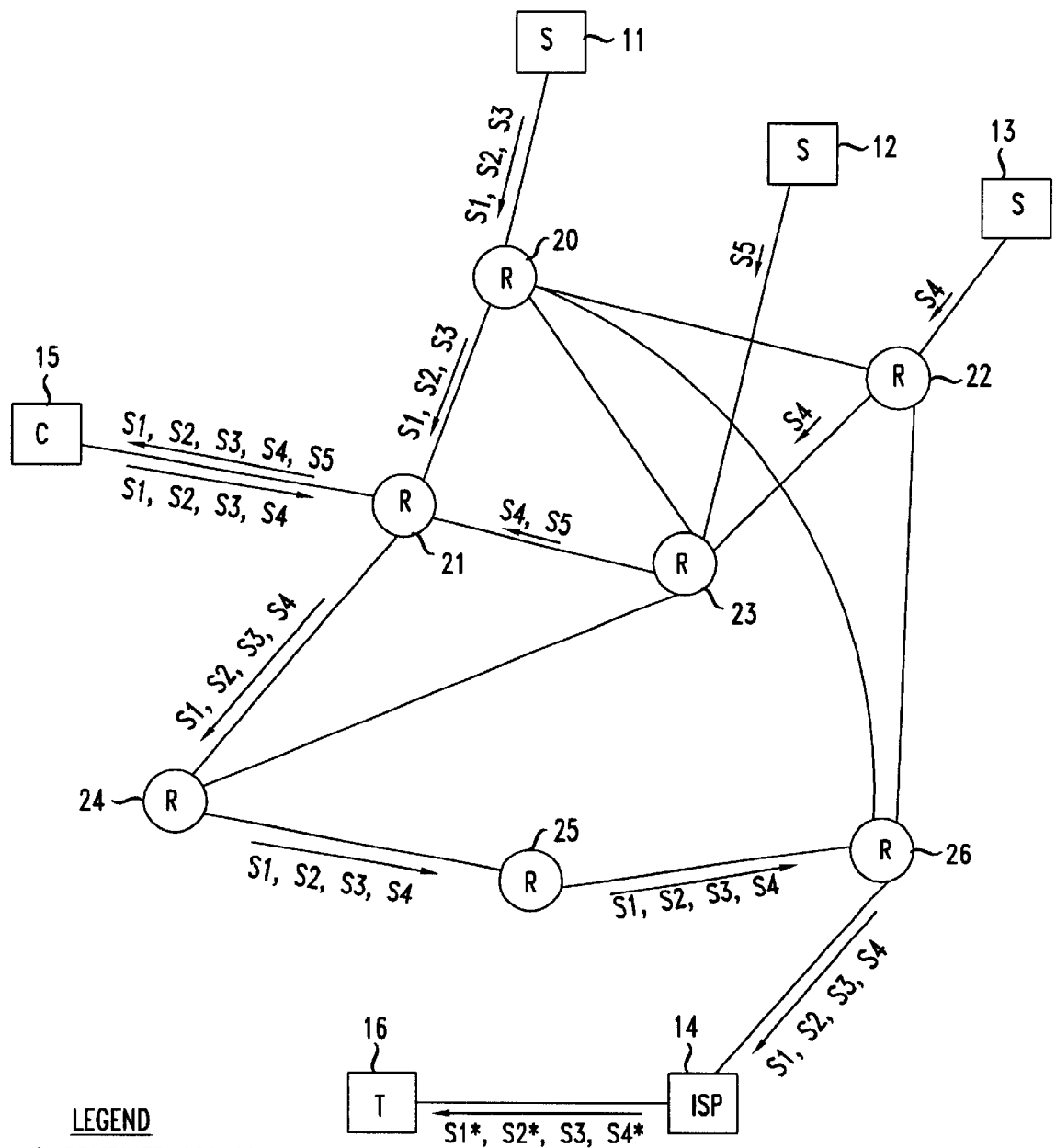
FIG. 3 depicts an arrangement where a combiner server transmits full bandwidth signals.

Recognizing that in many circumstances the bandwidth constriction is between the ISP processor and the terminal, a second embodiment in conformance with the principles of this invention can be realized where, as shown in FIG. 3, combiner server 15 sends the signals corresponding to the channel of current interest and the surfing signals in full bandwidth through the network and into ISP processor 14. The bandwidth reduction is performed in ISP processor 14. This embodiment has the disadvantage of sending more information through the network, but has the advantage that the switching delay between the selecting a low bandwidth surfed signal as the new channel of current interest is much reduced. Recognizing further that combiner server 15 serves the reduced function of merely selecting the particular multicast signals that terminal 16 wishes to received, that function can be distributed between ISP processor 14 and some of the multicast routers within the network, yielding a realization as shown in FIG. 4.

It should be appreciated that, actually, the principles disclosed herein are not limited to multicast signals. In its most general form, a combiner server can take as input zero or multicast streams, zero or more unicast streams, and produce as output surfer friendly unicast signals, multicast signals, or both.

Figure 2:
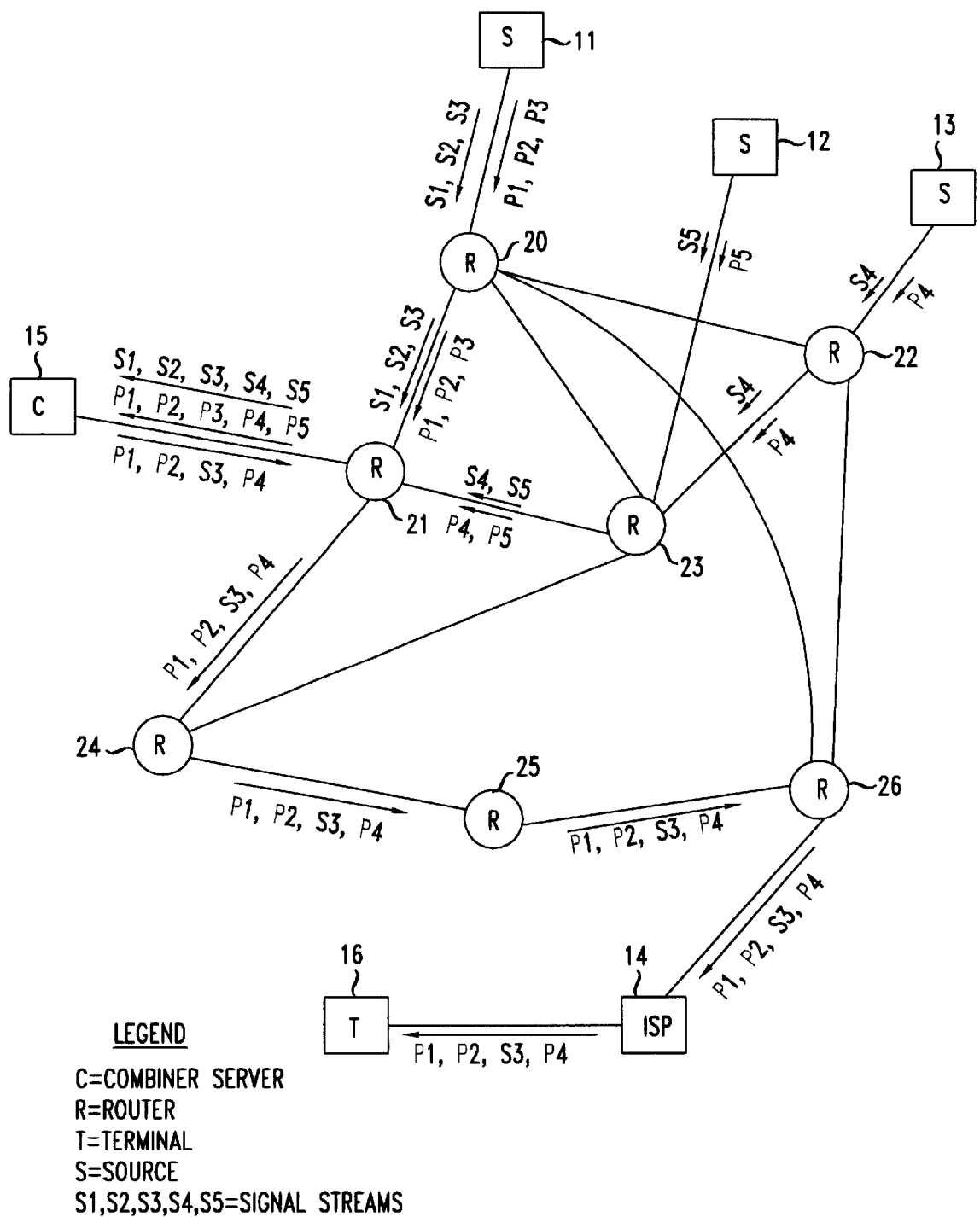
FIG. 2 illustrates an arrangement where packet streams from sources comprise full bandwidth signals, and low bandwidth preview signals.
Figure 4:
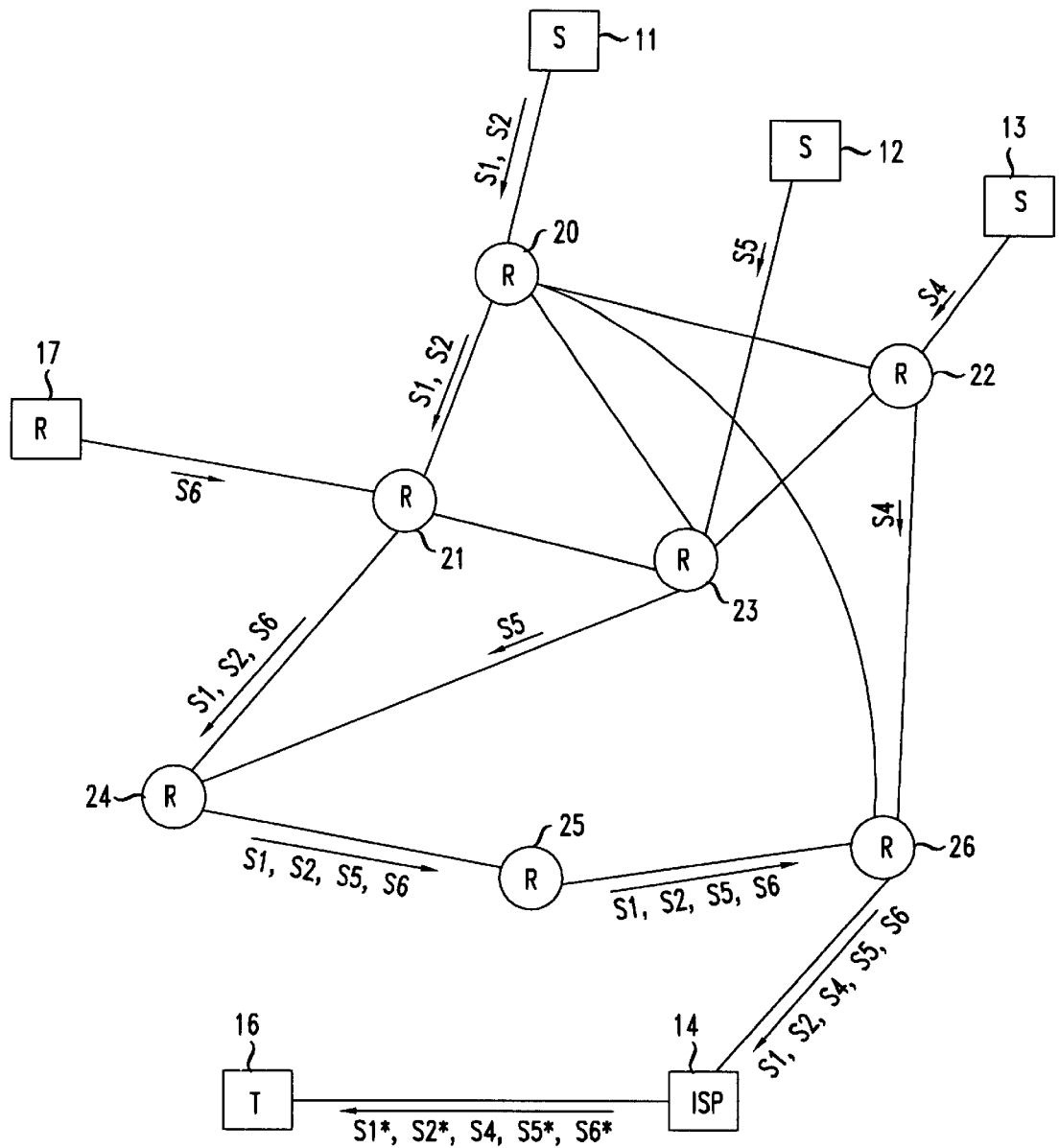
FIG. 4 presents an arrangement without a combiner server where multicast and/or unicast sources send information to an ISP processor, and the ISP processor develops full bandwidth and low bandwidth signals for a user.
Figure 5:
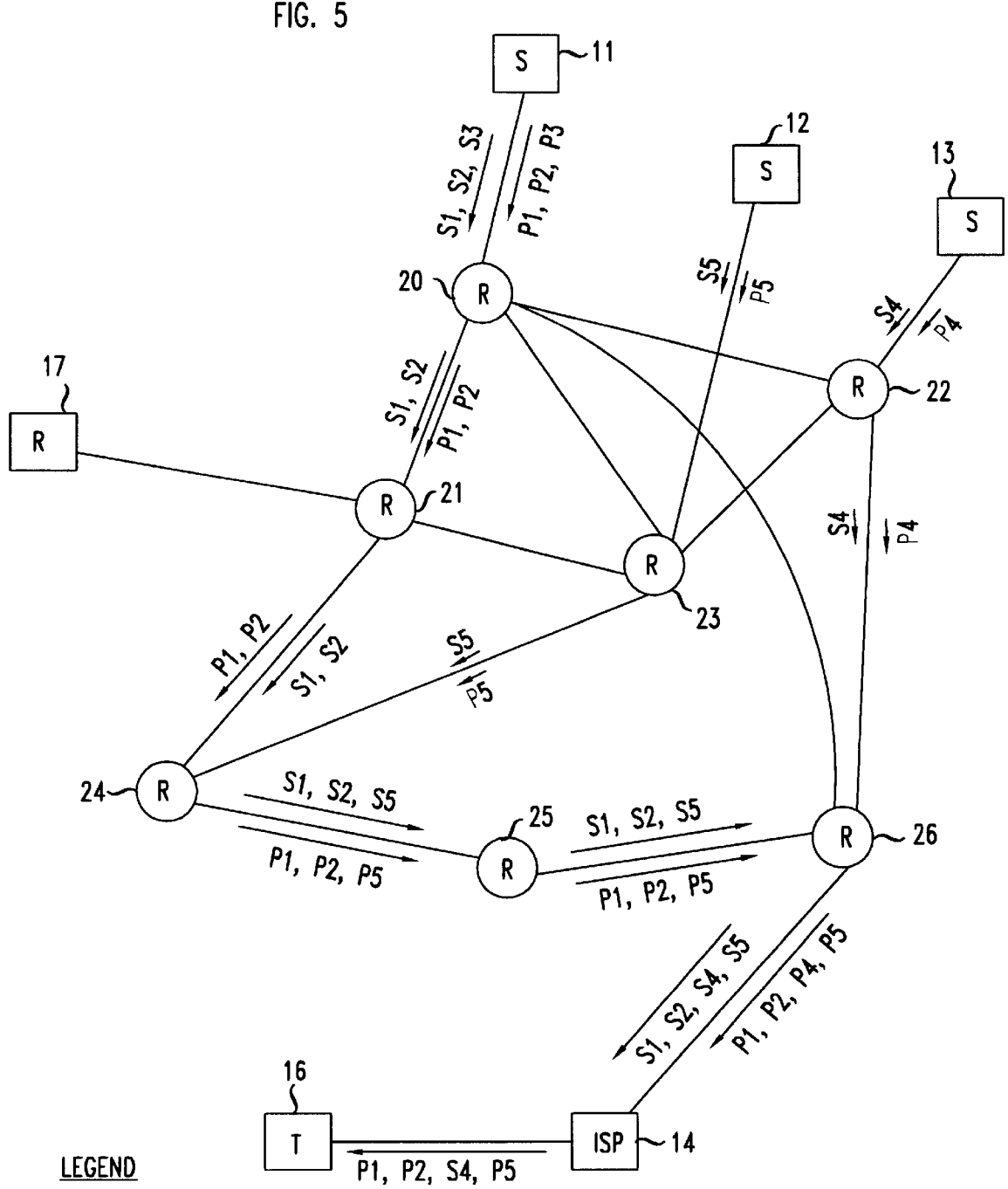
FIG. 5 illustrates an arrangement where sources like the FIG. 3 sources send both full bandwidth signals and preview signals.

Yet another embodiment is depicted in FIG. 5 which, in a sense, is a combination of the FIG. 2 and FIG. 4 embodiments. As depicted, FIG. 5 has each source send out the normal fidelity signal at full bandwidth, and a preview signal at a narrow bandwidth. These signals are multicast (or unicast) and, pursuant to the request of terminal 16, signals s1, s2, s4, and s5, as well as signals p1, p2, p4 and p5 arrive at ISP processor 14. ISP processor 14 selects the signal for the channel of current interest, and develops the stream p1, p2, s4, p5, and sends it to terminal 16. It may be noted that the sources of FIG. 5 can send out low fidelity replicas of their normal fidelity signals, instead of the preview signals.

Implementation of the various embodiments disclosed above follows conventional Internet protocols for receiving multicast signals. The software modules within combiner server 15, ISP processor 14 and terminal 16 are perfectly conventional.

It should be understood that the above-disclosed embodiments are merely illustrative of the principles of this invention, and that various modifications can be introduced without departing from the spirit and scope of this invention, which is limited only by the following claims. Illustratively, the discussion above relates to multi-casting, but it can apply to other forms of transmission. For instance, there are many information sources of interest that alter their information relatively infrequently. Stock market quote services, and news services (even images of newspapers) are examples of such sources. These sources can be asked to transmit their information over a low bandwidth channel, buffered at the ISP processor, or at the terminal, and presented to the surfing user on demand.

What is claimed is:

1. A server comprising:
    a first module for receiving a request for a surfing-friendly signal, where said request received by said first module specifies contents of said surfing-friendly signal in that said first module specifies a set of channels to be included in said surfing-friendly signals, and also specifies a channel in said set as a current interest channel that is to be at full fidelity;
    a second module for requesting incoming packet streams, from sources;
    a third module, responsive to said request, that selects one packet stream from among said incoming packet streams as the channel of current interest, and selects a set of other packet streams from said incoming packet streams, to form said surfing-friendly signal, that includes said current interest channel, and a set of reduced fidelity packet streams forming surfing channels, where each of the surfing channels corresponds to a different one of said packet streams in said set of other packet streams.

2. A server comprising:
    a first module for receiving a request for a surfing-friendly signal, where said request received by said first module specifies contents of said surfing-friendly signal, wherein said request received by said first module specifies a set of surfing channels to be included in said surfing-friendly signals, and also specifies a channel in said set that is to be at full fidelity;
    a second module for processing said request to identify a) a channel of current interest specified in said request, b) a remote source that can supply a signal in full fidelity corresponding to said channel of current interest, c) surfing channels specified in said request, and d) remote sources that can supply reduced fidelity signals corresponding to said surfing channels,
    a third module for requesting said remote source and said remote sources to send signals, and
    a fourth module for forming said surfing-friendly signal from signals received from said remote source and from said remote sources.

3. A method executed in a service-providing unit of sending a surfing-friendly signal to a terminal over a channel having a given bandwidth, comprising the steps of:
    receiving a specification of a) a channel of current interest that is to be presented in full fidelity and b) one or more surfing channels that are to be presented in reduced fidelity, wherein said specification identifies a remote source for said channel of current interest, and one or more remote sources for said one or more surfing channels, where said specification received specifies contents of said surfing-friendly signal,
    forming said surfing-friendly signal stream that comprises a full fidelity signal corresponding to said channel of current interest and reduced fidelity signals corresponding to said one or more surfing channels.

4. The method of claim 3 where said surfing-friendly signal stream comprises packets.

5. The method of claim 3 where said reduced fidelity signals are reduced quality facsimiles of corresponding full fidelity signals.

6. The method of claim 3 where said reduced fidelity signals are preview signals related to corresponding full fidelity signals.

7. The method of claim 6 where said preview signals are of a current signal segment of said corresponding full fidelity signals.

8. The method of claim 6 where said preview signals are of a queued signal segment of said corresponding full fidelity signals.

9. The method of claim 7 where said reduced fidelity signals of said surfing channels are reduced fidelity encoded music signals.

10. The method of claim 7 where said reduced fidelity signals of said surfing channels are preview signals of music signals.

11. The method of claim 10 where said preview signals are of currently paying music pieces.

12. The method of claim 10 where said preview signals are of queued music pieces.

13. The method of claim 10 where some of said preview signals are of currently paying music pieces, and some of said preview signals are of queued music pieces.

14. The method of claim 3 where at least one of said reduced fidelity signals is a preview related to a corresponding full fidelity signal and at least one of said reduced fidelity signals is a reduced quality facsimile of a corresponding full fidelity signal.

15. The method of claim 3 wherein said full fidelity signal corresponding to said channel of current interest and said reduced fidelity signals corresponding to said one or more surfing channels are selected from a set comprising multicast signals and unicast signals.

16. The method of claim 3 where bandwidth of said reduced fidelity signals is the lower of a given value or spare bandwidth divided by the number of said reduced fidelity signals.

17. The method of claim 3 where bandwidths of said reduced fidelity signals are the same.

18. The method of claim 3 where bandwidths of said reduced fidelity signals are nor all the same.

19. A software package comprising:
   a first module for displaying a plurality of channels to a user,
   a second module for specifying a source for each of said channels,
   a third module for enabling said user to specify a set of channels to be included in surfing-friendly signal, where said user specifies contents of said surfing-friendly signal, and to specify a channel in said set that to be at full fidelity, as a channel of current interest, and remaining ones of said channels as surfing channels, and
   a fourth module for enabling said user to select one of said channels, to cause a signal corresponding to a signal provided by a source assigned to said selected channel to be provided to said user.

20. The module of claim 19 where said second module specifies a fixed correspondence between sources and said channels.

21. The module of claim 19 said second module specifies a changing correspondence between sources and said channels based on an input from said user.

22. The module of claim 21 where said changed correspondence is a function of selections made by said fourth module.

23. The module of claim 21 where said changed correspondence is a function of user preferences.

24. The module of claim 21 where said second module specifies a changing correspondence between sources and said channels based on a selection of sources from a set of sources.

25. The module of claim 24 where said selection of sources from a set of sources is random or based on prior selections.

26. A server comprising:
   a first module for receiving a client request for a surfing-friendly signal;
   a second module for requesting, from one or more sources, packet streams that are to be received by said second module, which are needed to satisfy said client request and are not already being received by said second module;
   a third module that
      pursuant to a specification contained in said request, selects a plurality of packet streams from among said packet streams received by said second module, with one packet stream from among said plurality of packet streams being designated as a channel of current interest,
      forms said surfing-friendly signal characterized in that it contains said channel of current interest at full fidelity and remaining ones of said plurality of packet streams at reduced fidelity, said reduced fidelity packet streams being surfing channels, and
      transmits said surfing-friendly signal to said client;
   wherein said client request specifies contents of said surfing-friendly signal, and wherein said client request for a surfing-friendly signal specifies a set of channels to be included in said surfing-friendly signals, and also specifies a channel in said set that is to be at full fidelity.

27. The server of claim 26 where said client request for a surfing-friendly signal comprises an explicit request to modify said plurality of packet streams that are contained in said surfing-friendly signal.

28. The server of claim 26 where said client request for a surfing-friendly signal comprises a request to modify said channel of current interest.

29. The server of claim 26 where said client request for a surfing-friendly signal comprises a request to set one of said suffer channels as said channel of current interest.

30. The server of claim 29 where the surfer channel that is set as the channel of current interest is deleted from the set of reduced fidelity packet streams that form said surfing channels, and a reduced fidelity signal corresponding to the previous channel of current interest is included in said set of reduced fidelity packet streams that form said surfing channels.

31. The server of claim 29 where the surfer channel that is set as the channel of current from the set of reduced fidelity packet streams that form said surfing channels, and a reduced fidelity signal corresponding to yet another packet steam is included in said set of reduced fidelity packet steams that form said surfing channels.

32. The server of claim 26 where number of said packet streams included in said plurality of packet streams not more than a number specified in said request.

33. The server of claim 32 where number of said packet streams included in said plurality of packet streams is bounded by bandwidth considerations.

34. The server of claim 26 where each of said surfing channels occupies a bandwidth, and the bandwidths of said surfing channels are the same.

35. The server of claim 26 where each of said surfing channels occupies a bandwidth, and the bandwidths of said surfing channels are not all the same.

36. The server of claim 26, residing in an ISP processor that is coupled to a user computer or terminal.

37. The server of claim 26, residing in a combiner server that is remote (from an ISP processor that is coupled to a user computer or terminal.

\* \* \* \* \*